(12) United States Patent
Minaai et al.

(10) Patent No.: US 11,905,754 B2
(45) Date of Patent: Feb. 20, 2024

(54) VACUUM GLASS PANEL

(71) Applicant: NIPPON SHEET GLASS COMPANY, LIMITED, Tokyo (JP)

(72) Inventors: Tetsuo Minaai, Tokyo (JP); Tatsuhiro Nakazawa, Tokyo (JP); Hirotaka Koyo, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/252,491

(22) PCT Filed: May 27, 2019

(86) PCT No.: PCT/JP2019/020789
§ 371 (c)(1),
(2) Date: Dec. 15, 2020

(87) PCT Pub. No.: WO2019/244565
PCT Pub. Date: Dec. 26, 2019

(65) Prior Publication Data
US 2021/0270083 A1     Sep. 2, 2021

(30) Foreign Application Priority Data
Jun. 18, 2018  (JP) .................. 2018-115141

(51) Int. Cl.
*E06B 3/66* (2006.01)
*E06B 3/54* (2006.01)
*E06B 7/14* (2006.01)

(52) U.S. Cl.
CPC .......... *E06B 3/6612* (2013.01); *E06B 3/5454* (2013.01); *E06B 3/6621* (2013.01); *E06B 7/14* (2013.01)

(58) Field of Classification Search
CPC .... E06B 3/6612; E06B 3/5454; E06B 3/6621; E06B 3/66304; E06B 7/14
(Continued)

(56) References Cited

U.S. PATENT DOCUMENTS 2,595,927 A * 5/1952 Chapin ................ E06B 3/5409
52/767
2,629,467 A * 2/1953 Fry ........................ E04B 1/4107
52/214

(Continued)

FOREIGN PATENT DOCUMENTS

CN     1254656 A     5/2000
CN    204040824 U   12/2014
(Continued)

OTHER PUBLICATIONS https://www.interpane.com/fileadmin/user_upload/pdf-files/daten-und-richtlinien/en/Tolerance_Handbook_2018.pdf (Year: 2023).*
(Continued)

*Primary Examiner* — Brian D Mattei
*Assistant Examiner* — Joseph J. Sadlon
(74) *Attorney, Agent, or Firm* — Birch, Stewart, Kolasch & Birch, LLP (57) ABSTRACT

A vacuum glass panel including a vacuum glass, a sash, and a grazing gasket is provided. The vacuum glass includes a first glass plate, a second glass plate having substantially the same area as the area of the first glass plate in a front view, and a depressurized layer arranged between the first glass plate and the second glass plate opposed to the first glass plate. The lower face of the first glass plate and the lower face of the second glass plate are misaligned relative to each other in the vertical direction. The sash includes two groove walls that define a groove for receiving the upper, lower, right, and left peripheral edge portions of the vacuum glass
(Continued)

in a front view. The grazing gasket is arranged on at least the lower portion of the vacuum glass inside the groove and seals a gap between the vacuum glass and the groove walls, and includes a clamping portion for clamping the vacuum glass from a first outer principal surface of the first glass plate and a second outer principal surface of the second glass plate near the top portions of the groove walls.

8 Claims, 5 Drawing Sheets

(58) Field of Classification Search
USPC .......................................... 52/204.595, 786.1
See application file for complete search history.

(56) References Cited

U.S. PATENT DOCUMENTS

| | | | | |
|---|---|---|---|---|
| 2,716,783 | A * | 9/1955 | Fegan | E06B 3/28 52/204.593 |
| 3,438,110 | A * | 4/1969 | Lavallee | B21C 37/104 29/422 |
| 3,785,104 | A * | 1/1974 | Dailen | E04B 2/967 52/800.14 |
| 3,955,331 | A * | 5/1976 | Williams | E06B 3/62 52/204.591 |
| 3,974,613 | A * | 8/1976 | Criswell | E04B 2/92 52/204.597 |
| 4,038,797 | A * | 8/1977 | Hermann | E06B 3/6612 52/308 |
| 4,145,171 | A | 3/1979 | Guzowski | |
| 4,207,717 | A * | 6/1980 | Hubbard | E04B 2/96 52/771 |
| 4,240,235 | A * | 12/1980 | Nawa | E06B 3/62 52/843 |
| 4,524,978 | A * | 6/1985 | Mauser | E06B 3/62 52/844 |
| 4,791,011 | A * | 12/1988 | Mecca | B32B 17/10036 428/34 |
| 4,835,927 | A * | 6/1989 | Michlovic | E06B 3/6205 52/204.597 |
| 4,843,791 | A * | 7/1989 | Michlovic | E06B 3/68 52/204.593 |
| 4,913,976 | A * | 4/1990 | Brooks | B60J 10/79 428/494 |
| 5,038,537 | A * | 8/1991 | Frambach | E06B 3/325 52/204.593 |
| 5,579,616 | A * | 12/1996 | Farag | E04B 2/96 52/311.1 |
| 5,910,083 | A * | 6/1999 | Richardson | A47F 3/0434 52/656.1 |
| 6,115,989 | A * | 9/2000 | Boone | E06B 3/66366 52/786.13 |
| 6,293,049 | B1 * | 9/2001 | Shaw | E06B 3/44 49/183 |
| 6,581,342 | B1 * | 6/2003 | Tavivian | B32B 17/10005 52/204.597 |
| 7,302,780 | B2 * | 12/2007 | Sprague | E06B 3/5454 52/780 |
| 7,588,653 | B2 * | 9/2009 | Crandell | E06B 3/24 52/204.5 |
| 7,805,892 | B2 * | 10/2010 | Neumann | A47F 3/0434 52/204.593 |
| 7,819,999 | B2 * | 10/2010 | Watanabe | E06B 3/6621 156/244.11 |
| 7,851,034 | B2 * | 12/2010 | Cooper | E06B 3/6612 52/786.13 |
| 8,434,284 | B1 * | 5/2013 | Plummer | E06B 3/5892 52/745.16 |
| 8,573,195 | B2 * | 11/2013 | Tinoco Cavalheiro | E06B 3/6722 126/588 |
| 8,584,411 | B2 * | 11/2013 | Mitchell | E06B 7/14 52/302.1 |
| 9,228,389 | B2 * | 1/2016 | Heikkila | E06B 3/26305 |
| 9,290,984 | B2 * | 3/2016 | Hogan | E06B 3/6612 |
| 9,683,402 | B2 * | 6/2017 | Abdul Lathief | E04F 11/1846 |
| 9,695,628 | B2 * | 7/2017 | Jones | E06B 3/6612 |
| 9,719,253 | B2 * | 8/2017 | Stahl, Jr. | E04B 1/94 |
| 10,165,870 | B2 * | 1/2019 | Artwohl | E06B 3/6612 |
| 10,174,843 | B1 * | 1/2019 | Smallwood | B60J 10/70 |
| 10,213,059 | B2 * | 2/2019 | Ball | A47K 3/302 |
| 10,544,584 | B2 * | 1/2020 | Cecchetto, Jr. | E04B 1/08 |
| 10,689,900 | B2 * | 6/2020 | Caliaro | B23K 35/302 |
| 10,724,247 | B2 * | 7/2020 | Knapp | E06B 3/5427 |
| 2002/0189172 | A1 * | 12/2002 | Kaeser | E04B 2/82 52/64 |
| 2005/0266187 | A1 * | 12/2005 | Smith | B32B 17/10853 428/34 |
| 2007/0271853 | A1 * | 11/2007 | Yatsuda | B60J 10/74 49/489.1 |
| 2008/0115451 | A1 * | 5/2008 | Watanabe | B29C 48/16 52/309.3 |
| 2008/0245011 | A1 * | 10/2008 | Friedl | E06B 3/6775 52/745.19 |
| 2011/0072961 | A1 * | 3/2011 | Jungkuist | F41H 5/0407 89/905 |
| 2014/0003038 | A1 * | 1/2014 | Kim | F21L 4/08 362/183 |
| 2014/0034218 | A1 | 2/2014 | Hogan et al. | |
| 2014/0205774 | A1 * | 7/2014 | Caliaro | E06B 3/66357 428/34 |
| 2015/0068666 | A1 | 3/2015 | Abe et al. | |
| 2017/0241195 | A1 * | 8/2017 | Ota | B32B 17/1066 |

FOREIGN PATENT DOCUMENTS

| | | | | |
|---|---|---|---|---|
| DE | 202005000923 | U1 * | 5/2006 | .......... A47F 3/0434 |
| EP | 3279404 | A1 * | 2/2018 | ......... E04F 13/0821 |
| JP | 2000-64732 | A | 2/2000 | |
| JP | 2000064732 | A * | 2/2000 | .......... E06B 3/6205 |
| JP | 2001-303860 | A | 10/2001 | |
| JP | 2005-127104 | A | 5/2005 | |
| JP | 2005-264502 | A | 9/2005 | |
| JP | 2006-124985 | A | 5/2006 | |
| JP | 2006-299527 | A | 11/2006 | |
| JP | 2015-529623 | A | 10/2015 | |
| JP | 2017-160119 | A | 9/2017 | |
| WO | WO-8803518 | A1 * | 5/1988 | ............. A47H 21/00 |
| WO | WO-2017084767 | A1 * | 5/2017 | ....... B29C 45/14344 |

OTHER PUBLICATIONS https://pliki.ekookna.pl/files/en/Prints,%20contracts,%20forms,%20warranty%20cards/Warranty%20Card/quality-assessment-criteria-for-insulated-glass-units.pdf (Year: 2023).*

International Search Report, issued in PCT/JP2019/020789, dated Jul. 2, 2019.

Written Opinion of the International Searching Authority, issued in PCT/JP2019/020789, dated Jul. 2, 2019.

Extended European Search Report for European Application No. 19822206.9 dated Nov. 15, 2021.

Japanese Office Action for Japanese Application No. 2018-115141, dated Aug. 3, 2021, with English translation.

Chinese Ofice Action and Search Report dated Apr. 26, 2022 for counterpart Application No. 201980040024.0, with an English translation.

Chinese Office Action and Search Report for Chinese Application No. 201980040024.0, dated Aug. 11, 2022, with English translation of the Office Action.

Chinese Office Action for Chinese Application No. 201980040024.0, dated Dec. 26, 2022, with an English translation.

* cited by examiner

VACUUM GLASS PANEL

TECHNICAL FIELD

The present invention relates to a vacuum glass panel, and particularly relates to a vacuum glass panel equipped with a sash.

BACKGROUND ART

Double-glazed glass in which a depressurized layer is formed between two glass plates through depressurization is also called vacuum glass. Vacuum glass is excellent in that it has great heat-insulating properties, it can be used to form a glass panel with a reduced thickness due to the distance between the two glass plates being smaller than that in conventional double-glazed glass, and so on.

Incidentally, in many cases, vacuum glass is used in a state in which a sash serving as a supporting frame is attached along the outer periphery of the vacuum glass and the vacuum glass is fitted to a groove inside the sash. At this time, for the purpose of ensuring the water-tightness of the sash, a grazing gasket is often attached in a gap between the sash and the vacuum glass to fill this gap. Patent Literature 1 discloses such a vacuum glass panel.

FIG. 3 in Patent Literature 1 discloses vacuum glass including two glass plates that are different in size, and the two glass plates are supported in the sash in a state in which the lower face of one of the two glass plates is higher than the lower face of the other glass plate as shown in FIG. 4 in Patent Literature 1.

CITATION LIST

Patent Literature

Patent Literature 1: JP 2005-264502A

SUMMARY OF INVENTION

Technical Problem

When vacuum glass stands in the "standing-on-one-foot" state as described above (see FIG. 1A), the weight of the glass plate with the lower face that is higher than the lower face of the other glass plate is supported by the other glass plate (referred to as a "standing glass plate" hereinafter). At this time, not only the weight of the standing glass plate but also the weight of the glass plate with the lower face that is higher than the lower face of the standing glass plate is applied to the lower face of the standing glass plate, and thus stress is likely to concentrate at this portion. Accordingly, there is a risk of damage to the standing glass plate emanating from that portion and damage to peripheral components such as a sash. However, in the case of a vacuum glass panel as disclosed in Patent Literature 1 that is originally intended to "stand on one foot", the strengths of the glass plates and the peripheral components are determined on that premise, and therefore, it can be said that an issue with damage is less likely to arise.

Figure 1A:
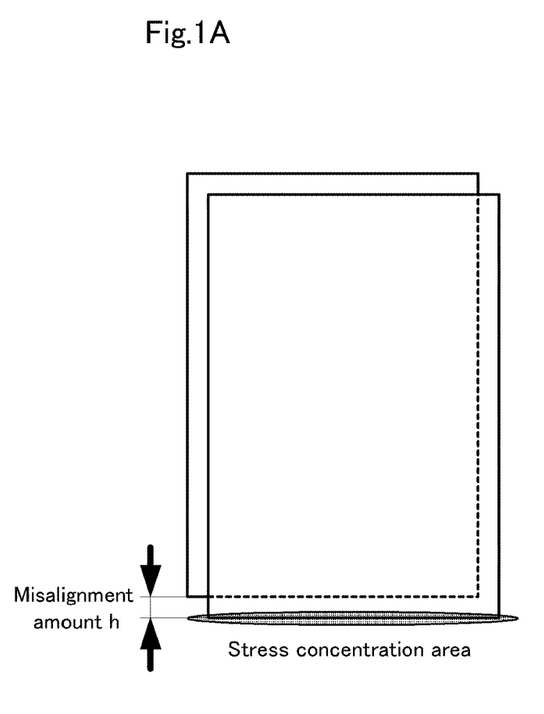
FIG. 1A shows an example of a state in which two glass plates included in vacuum glass are misaligned.

However, if two glass plates are misaligned due to a manufacturing error and the vacuum glass "stands on one foot", for example, damage as mentioned above is more likely to occur. Misalignment due to a manufacturing error is not limited to the state as shown in FIG. 1A, and a state in which the weights are supported by only a portion of the lower face of one glass plate (see FIG. 1B) is also conceivable, for example. In this case, damage is even more likely to occur. As other examples, a state in which the weights are supported by the entire lower face of one glass plate and a portion of the lower face of the other glass plate (see FIG. 1C) and a state in which the weights are supported by portions of the lower faces of the two glass plates (see FIG. 1D) are also conceivable. In these cases, stress may be more likely to be dispersed compared with the cases where vacuum glass "stands on one foot", but there is still the possibility that damage will occur.

In particular, vacuum glass has a more rigid structure due to the depressurized layer being sealed, and thus the two glass plates are more firmly integrated and stress such as bending stress is likely to be applied directly to the edges of the integrated glass plates. Therefore, the damage issue may become more prominent. Furthermore, recent years have seen an increase in the size of vacuum glass. Under these circumstances, the heavier the weight of vacuum glass is, the more prominent the damage issue may become.

It is an object of the present invention to provide a vacuum glass panel capable of reducing the likelihood of being damaged.

Solution to Problem

A vacuum glass panel according to a first aspect of the present invention includes vacuum glass, a sash, and a grazing gasket. The vacuum glass includes: a first glass plate having a first outer principal surface, a first inner principal surface, and a first lower face; a second glass plate having a second outer principal surface, a second inner principal surface, and a second lower face, and having substantially the same area as an area of the first glass plate in a front view; and a depressurized layer arranged between the first inner principal surface and the second inner principal surface opposed to the first inner principal surface. The first lower face and the second lower face are misaligned relative to each other in a vertical direction. The sash includes two groove walls that define a groove for receiving upper, lower, left, and right peripheral edge portions of the vacuum glass in a front view. The grazing gasket is arranged on at least a lower portion of the vacuum glass inside the groove and seals gaps between the vacuum glass and the groove walls. The grazing gasket includes a clamping portion for clamping the vacuum glass from the first outer principal surface and the second outer principal surface near top portions of the groove walls.

A vacuum glass panel according to a second aspect of the present invention is the vacuum glass panel according to the first aspect, wherein the areas of the first glass plate and the second glass plate in a front view are 1 m² or more.

A vacuum glass panel according to a third aspect of the present invention is the vacuum glass panel according to the first or second aspect, wherein the grazing gasket further includes a bottom portion facing the first lower face and the second lower face.

A vacuum glass panel according to a fourth aspect of the present invention is the vacuum glass panel according to the third aspect, wherein the bottom portion is constituted by an elastic body and is in contact with at least one of the first lower face and the second lower face.

A vacuum glass panel according to a fifth aspect of the present invention is the vacuum glass panel according to the third or fourth aspect, wherein the bottom portion has a thickness of 0.5 mm or more, and the thickness is larger than an amount of misalignment between the first lower face and the second lower face in a vertical direction.

A vacuum glass panel according to a sixth aspect of the present invention is the vacuum glass panel according to any one of the first to fifth aspects, wherein an amount of misalignment between the first lower face and the second lower face in a vertical direction is 0.5 mm or more.

A vacuum glass panel according to a seventh aspect of the present invention is the vacuum glass panel according to any one of the first to sixth aspects, wherein the clamping portion clamps the vacuum glass from the first outer principal surface and the second outer principal surface at height positions spaced apart upward by 0 mm to 20 mm from height positions of the top portions.

A vacuum glass panel according to an eighth aspect of the present invention is the vacuum glass panel according to any one of the first to seventh aspects, wherein the sash and the grazing gasket are provided with a drain hole.

A vacuum glass panel according to a ninth aspect of the present invention is the vacuum glass panel according to any one of the first to eighth aspects, wherein the first lower face and the second lower face are not in parallel with each other.

Advantageous Effects of the Invention

With the above-described aspects of the present invention, vacuum glass including two glass plates with substantially the same area in a front view is provided. The upper, lower, left, and right peripheral edge portions of the vacuum glass in a front view are received by a groove of a sash, and at least a gap between the lower portion of the vacuum glass and the sash is sealed by a grazing gasket. The grazing gasket clamps the two glass plates from the outer principal surfaces thereof near the top portions of the groove walls of the sash. That is, forces are applied to two side faces of the vacuum glass and thus the vacuum glass is supported from the two sides, and therefore, the weight applied to the bottom contact face of the vacuum glass is reduced. As a result, even under conditions where the two glass plates are significantly misaligned, the likelihood of the vacuum glass panel being damaged can be reduced.

DESCRIPTION OF EMBODIMENTS

Hereinafter, a vacuum glass panel according to an embodiment of the present invention will be described with reference to the drawings.

1. Overall Configuration of Vacuum Glass Panel

Figure 2:
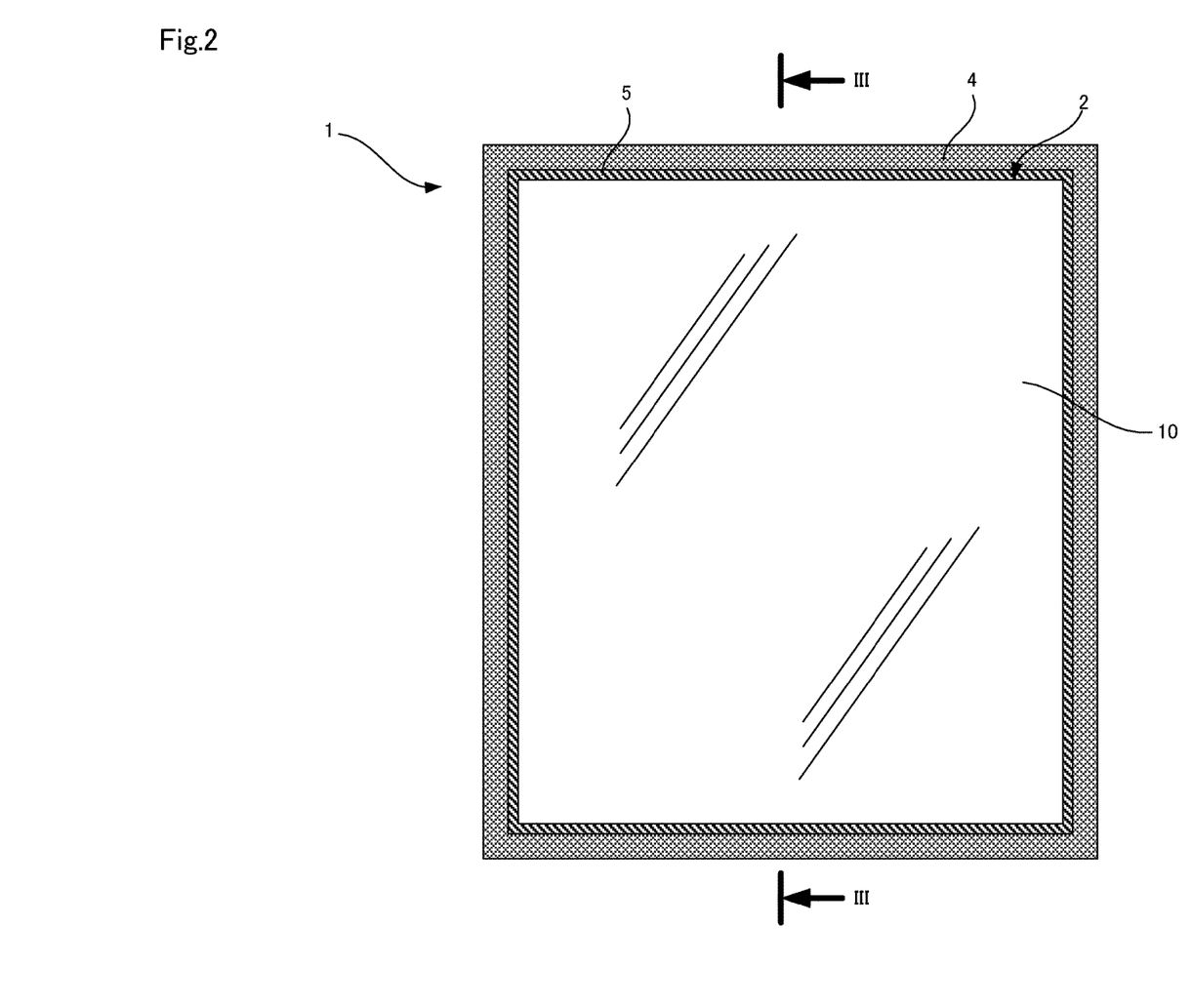
FIG. 2 is a front view of a vacuum glass panel according to an embodiment of the present invention.
Figure 3:
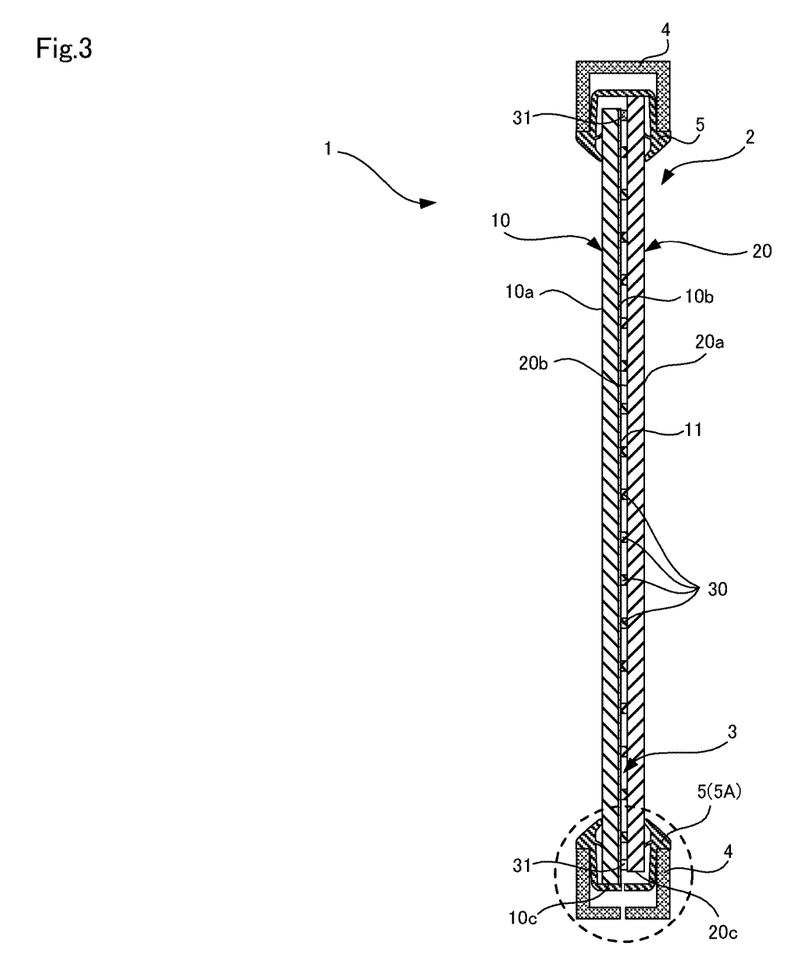
FIG. 3 is a cross-sectional view taken along line III-III in FIG. 2.

FIG. 2 is a front view of a vacuum glass panel 1 according to an embodiment of the present invention, and FIG. 3 is a lateral cross-sectional view thereof. As shown in these diagrams, the vacuum glass panel 1 includes vacuum glass 2, and a sash 4 serving as a supporting frame for the vacuum glass 2. The sash 4 is attached to the entire periphery of the vacuum glass 2 along the outer peripheral edges thereof. In addition, for the purpose of ensuring the water-tightness of the sash 4, a grazing gasket 5 is attached in a gap between the vacuum glass 2 and the sash 4 to fill this gap. The grazing gasket 5 is also attached to the entire periphery of the vacuum glass 2 along the outer peripheral edges thereof. There is no particular limitation on the application of the vacuum glass panel 1, but the vacuum glass panel 1 of this embodiment is used as a building material such as window glass or door glass in a building.

The following describes the specific configurations of the vacuum glass 2, the sash 4, and the grazing gasket 5 in the stated order.

2. Configurations of Components 2-1. Configuration of Vacuum Glass

As shown in FIG. 3, the vacuum glass 2 is a glass structure including two glass plates 10 and 20, and the glass plates 10 and 20 are arranged such that their principal surfaces extend in parallel with each other with a depressurized layer 3 being located therebetween. The glass plate 10 (also referred to as a "first glass plate 10" hereinafter) is arranged on the outdoor side, and the glass plate 20 (also referred to as a "second glass plate 20" hereinafter) is arranged on the indoor side. The first glass plate 10 and the second glass plate 20 have substantially the same area in a front view. It should be noted that the term "front view" as used herein means that the glass plates 10 and 20 are viewed in a direction orthogonal to their principal surfaces. In the description below, a side face of the first glass plate 10 that faces the outdoor side is referred to as a "first outer principal surface 10$a$", and a side face of the first glass plate 10 that faces the second glass plate is referred to as a "first inner principal surface 10$b$". Similarly, a side face of the second glass plate 20 that faces the indoor side is referred to as a "second outer principal surface 20$a$", and a side face of the second glass plate 20 that faces the first glass plate 10 is referred to as a "second inner principal surface 20$b$".

Many spacers 30 having substantially the same thickness are arranged at regular intervals on the inner principal surface (more precisely, on a low-emissivity film 11, which will be described later) of the first glass plate 10 and the inner principal surface 20$b$ of the second glass plate 20 between the first glass plate 10 and the second glass plate 20. Due to these spacers 30, the depressurized layer 3 having a uniform thickness, which corresponds to the thickness of the spacers 30, is secured between the inner principal surface 10$b$ (more precisely, on the low-emissivity film 11, which will be described later) of the first glass plate 10 and the inner principal surface 20$b$ of the second glass plate 20. The depressurized layer 3 is depressurized to a pressure lower than the standard atmospheric pressure, typically to 1.33 Pa or lower, and is also referred to as a "vacuum layer". The depressurized layer 3 that is in a substantially vacuum state as described above suppresses heat transfer and heat convection between the outdoor side and the indoor side of the vacuum glass 2, and thus heat on the indoor side is not released to the outdoor side, and excellent heat insulation properties are imparted to the vacuum glass 2.

The first glass plate 10 of this embodiment is a Low-E glass plate, and a low-emissivity film (Low-E film) 11 is stacked on the substantially entire first inner principal surface 10b. The low-emissivity film 11 suppresses heat emission and thus contributes to a further improvement in the heat insulation properties of the vacuum glass 2.

A sealing member 31 is arranged along the entire outer peripheral edges of the first glass plate 10 and the second glass plate 20 between the two glass plates 10 and 20. The sealing member 31 is a member for coupling the two glass plates 10 and sealing the depressurized layer 3 located between the two glass plates 10 and 20, and maintaining a substantially vacuum state of the depressurized layer 3. The sealing member 31 of this embodiment is made of glass frit having a low melting point, but there is no limitation thereto.

The thicknesses (average thicknesses are used when the thicknesses are not uniform) of the first glass plate 10, the second glass plate 20, the depressurized layer 3, and the low-emissivity film 11 are taken as d1, d2, d3, and d4, respectively. The values of d1 to d4 can be selected as appropriate in accordance with the application, and d1 is preferably 2.5 mm or more and 15 mm or less, more preferably 2.5 mm or more and 12 mm or less, and even more preferably 3 mm or more and 6 mm or less. The same applies to d2, and d1 and d2 may be the same or different. d3 is preferably 0.03 mm or more and 1 mm or less, more preferably 0.03 mm or more and mm or less, and even more preferably 0.03 mm or more and mm or less. d4 is preferably 50 nm or more and 500 nm or less, more preferably 50 nm or more and 400 nm or less, and even more preferably 50 nm or more and 300 nm or less. When d1 to d4 satisfy the numerical ranges described above, the thickness of the vacuum glass 2 can be reduced while the heat insulation properties can be improved.

Here, the lower face of the first glass plate 10 is referred to as a "first lower face 10c", and the lower face of the second glass plate 20 is referred to as a "second lower face 20c". The first lower face 10c is a face that connects the lower edge of the first outer principal surface 10a and the lower edge of the first inner principal surface 10b, and the second lower face 20c is a face that connects the lower edge of the second outer principal surface 20a and the lower edge of the second inner principal surface 20b. In this embodiment, the first lower face 10c and the second lower face 20c are misaligned relative to each other in the vertical direction, and are not substantially located on the same plane. There are various vertical misalignment states, and the states shown in FIGS. 1A to 1D are conceivable, for example. Such misalignment may occur due to a manufacturing error in a process in which the first glass plate 10 and the second glass plate 20 are assembled such that they oppose to each other.

Figure 1B:
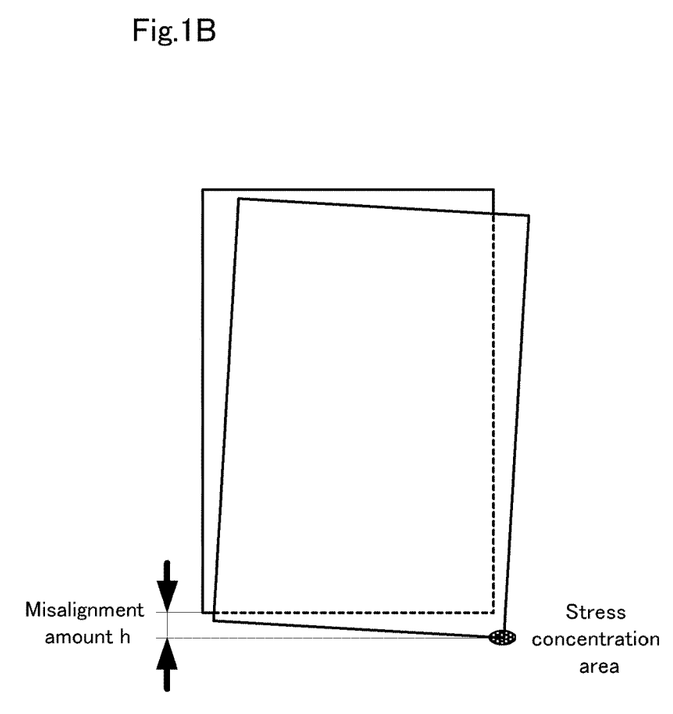
FIG. 1B shows another example of a state in which two glass plates included in vacuum glass are misaligned.
Figure 1C:
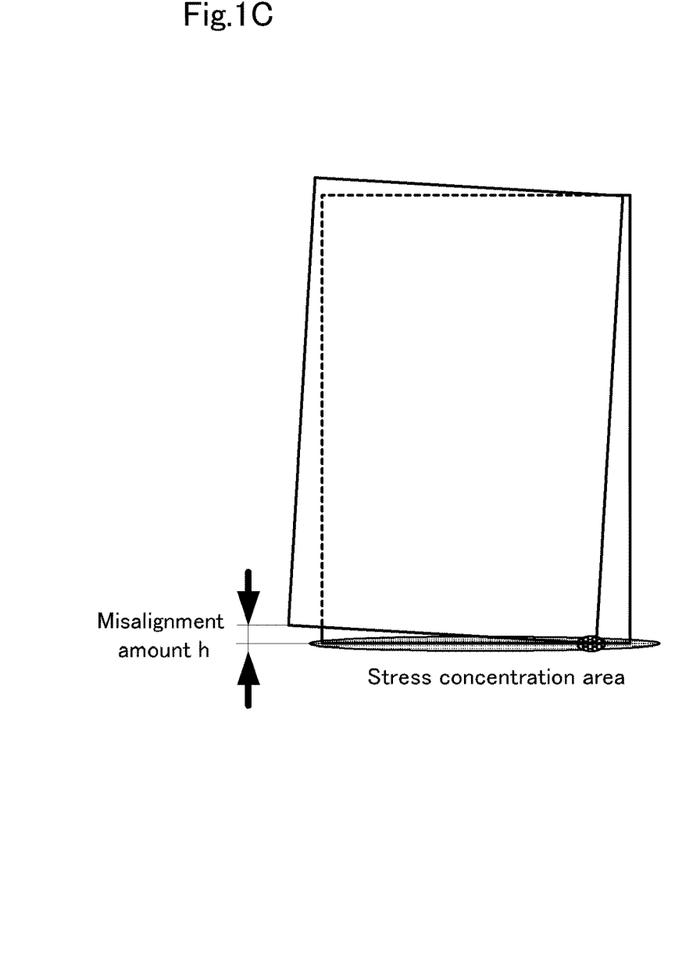
FIG. 1C shows yet another example of a state in which two glass plates included in vacuum glass are misaligned.
Figure 1D:
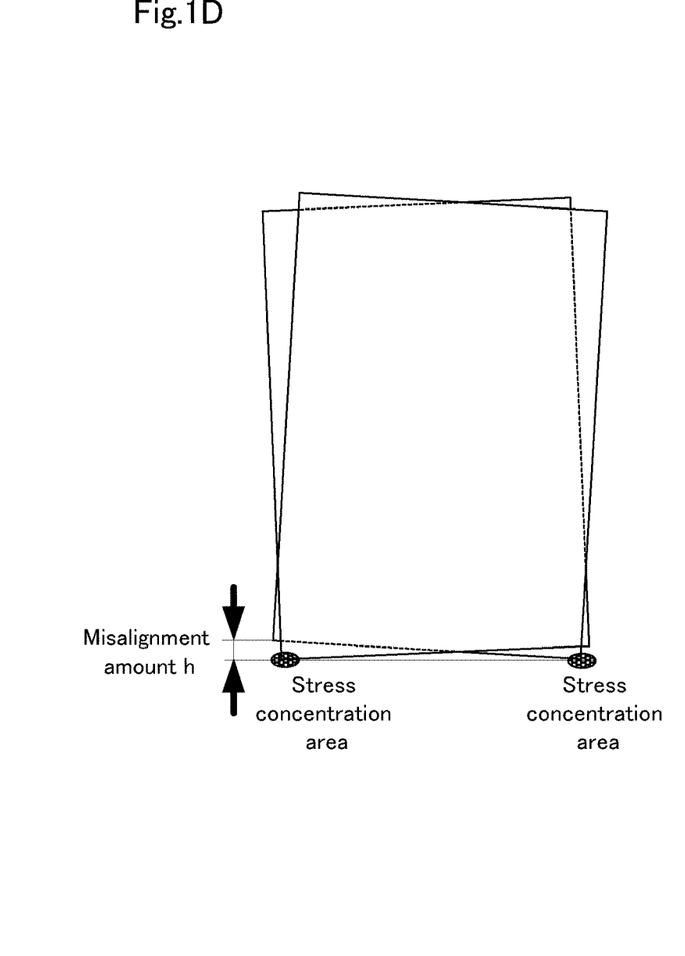
FIG. 1D shows yet another example of a state in which two glass plates included in vacuum glass are misaligned.

If the misalignments as mentioned above occur, the entire weight of the vacuum glass 2 cannot be supported by the entire first lower face 10c and the entire second lower face 20c, and thus stress concentration may occur. In FIGS. 1A and 1B, the entire weight of the vacuum glass 2 is applied to only one of the glass plates 10 and 20, and the vacuum glass 2 "stands on one foot". In FIGS. 1B to 1D, the first lower face 10c and the second lower face 20c are not in parallel with each other, and one is substantially inclined relative to the other. Accordingly, the weight concentrates on not the entire lower face but a portion of the lower face of at least one of the glass plates 10 and 20. The misalignments as mentioned above may increase the likelihood of the glass plates 10 and 20 and peripheral components being damaged compared with the case where the first lower face 10c and the second lower face 20c are located on substantially the same plane and the weight of the vacuum glass 2 is applied to the two lower faces 10c and in a substantially evenly dispersed state. However, in this embodiment, as described later, the grazing gasket 5 reduces the weight applied to the bottom contact face of the vacuum glass 2, and thus the vacuum glass 2 is prevented from being damaged.

The amount of misalignment between the first lower face and the second lower face 20c in the vertical direction is taken as h (see FIG. 1). At this time, the damage issue described above becomes more prominent when h is 0.5 mm or more, the damage problem becomes even more prominent when h is 2 mm or more, and the damage problem becomes even more prominent when h is 3 mm or more. It should be noted that the misalignment amount h is the larger of the size of a gap in the vertical direction between the lowermost point included in the first lower face 10c and the topmost point included in the second lower face 20c and the size of a gap in the vertical direction between the topmost point included in the first lower face 10c and the lowermost point included in the second lower face 20c.

The larger areas S (equal to the areas of the principal surfaces 10a, 10b, 20a, and 20b) of the first glass plate 10 and the second glass plate 20 in a front view are, the more likely it is that misalignments as mentioned above will occur. Such misalignments become prominent particularly when S is 1 m² or more, such misalignments become more prominent when S is 2 m² or more, and such misalignments become even more prominent when S is 3 m² or more.

2-2. Configuration of Sash

Figure 4:
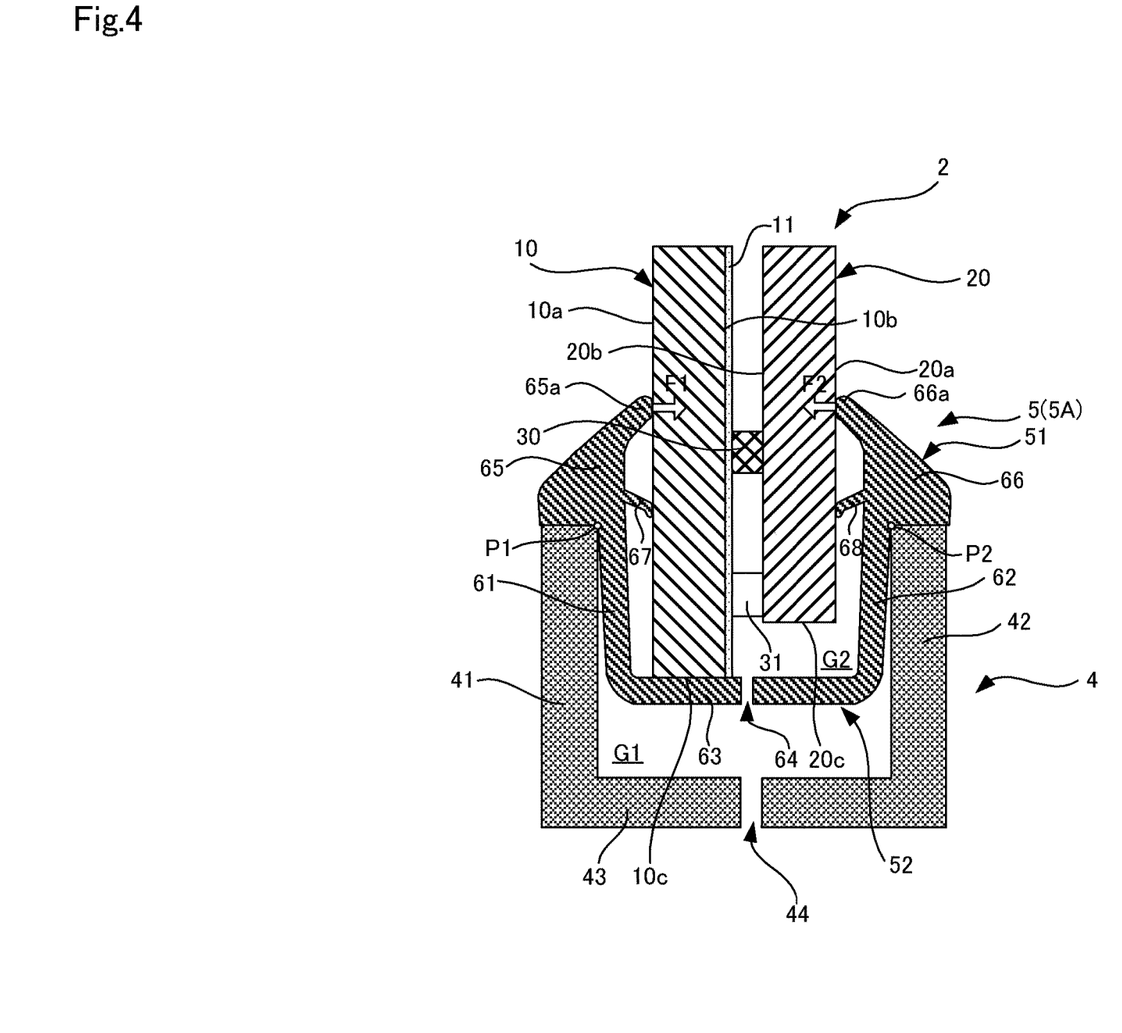
FIG. 4 is a partially enlarged view of a portion surrounded by a dashed circle in FIG. 2.

The sash 4 defines a groove that receives the entire periphery of the vacuum glass 2 (also referred to as an "outer peripheral portion" hereinafter), namely the upper, lower, left, and right peripheral edge portions thereof, in a front view. The following describes the specific structure of the vicinity of a portion of the groove that receives the lower portion of the vacuum glass 2 (such a portion is referred to as a "groove G1" hereinafter). FIG. 4 is a lateral cross-sectional view showing a state of the vicinity of the groove G1.

The sash 4 includes two groove walls 41 and 42, and a bottom portion 43 that couples the lower portions of these groove walls 41 and 42, and these portions 41 to 43 define the groove G1. The groove wall 41 is arranged on the outdoor side, and the groove wall 42 is arranged on the indoor side. The groove walls 41 and 42 and the bottom portion 43 extend over the entire lower portion of the vacuum glass 2 in the longitudinal direction thereof.

The bottom portion 43 is provided with a drain hole 44. A plurality of drain holes 44 are arranged at predetermined intervals in the longitudinal direction of the bottom portion 43.

As shown in FIG. 4, the groove G1 receives the lower portion of the vacuum glass 2 via the grazing gasket 5. That is, the grazing gasket 5 is inserted into the groove G1, and then the lower portion of the vacuum glass 2 is inserted into the grazing gasket 5. At this time, the groove wall 41 covers the lower portion of the first outer principal surface 10a of the first glass plate 10, and the groove wall 42 covers the lower portion of the second outer principal surface 20a of the second glass plate 20. Also, at this time, the bottom portion 43 covers the first lower face 10c of the first glass plate 10 and the second lower face 20c of the second glass plate 20. However, the lower portion of the vacuum glass 2 is not indirect contact with the inner face of the groove G1 because the grazing gasket is present therebetween.

The sash 4 of this embodiment is made of aluminum. However, there is no limitation to this example, and the sash 4 may be made of another metal or a hard resin, for example.

2-3. Configuration of Grazing Gasket

The grazing gasket 5 is a member for sealing gaps between the outer peripheral portion of the vacuum glass 2 and the groove walls of the groove of the sash 4 into which the outer peripheral portion of the vacuum glass 2 is inserted. This ensures the water-tightness of the groove of the sash 4, thus making it possible to inhibit water such as rainwater from entering the groove. The following describes the specific configuration of a portion of the grazing gasket 5 (denoted by reference numeral 5A hereinafter) extending along the lower portion of the vacuum glass 2. The grazing gasket 5A extends over the entire lower portion of the vacuum glass 2 in the longitudinal direction thereof. The grazing gasket 5A seals gaps between the lower portion of the vacuum glass 2 and the groove walls 41 and 42 located at the lower portion of the sash 4.

The grazing gasket 5A includes an upper portion 51 and a lower portion 52. The lower portion 52 is arranged inside the groove G1 of the sash 4, and the upper portion 51 protrudes from the groove G1 of the sash 4. In this embodiment, the grazing gasket 5 is a member having a groove-like shape and is also called a grazing channel. Accordingly, the lower portion 52 includes two groove walls 61 and 62, and a bottom portion 63 that couples the lower portions of the groove walls 61 and 62. These portions 61 to 63 define a groove G2. The groove wall 61 is arranged on the outdoor side, and the groove wall 62 is arranged on the indoor side. The groove walls 61 and 62 and the bottom portion 63 extend over the entire lower portion of the vacuum glass 2 in the longitudinal direction thereof. The groove wall 61 is spaced apart from the first outer principal surface 10a of the first glass plate 10 and is not in contact therewith, but is in contact with the inner face of the groove wall 41 of the sash 4. Similarly, the groove wall 62 is spaced apart from the second outer principal surface 20a of the second glass plate 20 and is not in contact therewith, but is in contact with the inner face of the groove wall 42 of the sash 4. In this embodiment, only the vicinities of the upper end portions of the groove walls 61 and 62 are in contact with the inner faces of the groove walls 41 and 42 of the sash 4.

The bottom portion 63 faces the first lower face 10c of the first glass plate 10 and the second lower face 20c of the second glass plate 20. However, due to the misalignment between the glass plates 10 and 20 described above, the bottom portion 63 is not in contact with the entire first lower face 10c and the entire second lower face 20c. At the position of the cross section shown in FIG. 4 in the longitudinal direction of the bottom portion 63, the first lower face 10c is in contact with the bottom portion 63, but the second lower face 20c is located above the bottom portion 63. As a result, the weight of the vacuum glass 2 is applied to the bottom contact faces of portions of the first lower face 10c and the second lower face 20c in a concentrated manner.

The upper portion 51 includes two wall portions 65 and 66 that are separately arranged on the outdoor side and the indoor side, respectively. The wall portion 65 is continuous with the upper end of the groove wall 61 on the outdoor side, and is in contact with the top portion of the groove wall 41 of the sash 4 and covers at least a portion thereof. The wall portion 65 is inclined so as to approach the first outer principal surface 10a of the first glass plate 10 as it extends upward, and an upper end portion 65a thereof is in contact with the first outer principal surface 10a. Similarly, the wall portion 66 is continuous with the upper end of the groove wall 62 on the indoor side, and is in contact with the top portion of the groove wall 42 of the sash 4 and covers at least a portion thereof. The wall portion 66 is inclined so as to approach the second outer principal surface 20a of the second glass plate as it extends upward, and an upper end portion 66a thereof is in contact with the second outer principal surface 20a.

In this manner, the two upper end portions 65a and 66a of the grazing gasket 5A form a clamping portion for clamping the vacuum glass 2. That is, this clamping portion clamps the lower portion of the vacuum glass 2 from the first outer principal surface 10a and the second outer principal surface 20a, and applies inward forces F1 and F2 (see FIG. 4) to these faces 10a and 20a, respectively. More specifically, the bottom portion 63 is pressed downward under the weight of the vacuum glass 2, and thus a force that draws the groove walls 61 and 62 downward is generated. This force is converted to the forces F1 and F2 with which the wall portions 65 and 66 press the vacuum glass laterally (inward) using, as supporting points, inner ends P1 and P2 of the top portions of the groove walls 41 and 42 of the sash 4. The vacuum glass 2 is supported from the two sides due to the forces F1 and F2, and thus the weight applied to the bottom contact face of the vacuum glass 2 is reduced. As a result, the likelihood of the glass plates 10 and 20 and peripheral components being damaged is reduced.

In this embodiment, the upper end portions 65a and 66a included in the clamping portion are respectively in contact with the first outer principal surface 10a and the second outer principal surface 20a near the top portions of the groove walls 41 and 42 of the sash 4. That is, the points in the upper end portions 65a and 66a from which the forces F1 and F2 are applied are located near the points in the grazing gasket 5A to which forces are applied from the sash 4, namely the inner end P1 and P2 of the top portions of the groove walls 41 and 42 of the sash 4 (see FIG. 4), and thus the forces F1 and F2 are increased. From this viewpoint, the height positions of the points in the upper end portions 65a and 66a from which the forces F1 and F2 are applied are spaced apart upward by preferably 0 mm to 20 mm, more preferably 0 mm to 10 mm, and even more preferably 0 mm to 7 mm, from the inner ends P1 and P2. It should be noted that shorter distances from the inner ends P1 and P2 to the points in the upper end portions 65a and 66a from which the forces F1 and F2 are applied are preferable because the forces F1 and F2 with which the vacuum glass 2 is clamped can be increased.

In this embodiment, two valve bodies 67 and 68 that respectively protrude inward from the wall portions 65 and 66 extend from the grazing gasket 5A below the lower portions of the upper end portions 65a and 66a. The valve bodies 67 and 68 are in contact with the first outer principal surface 10a of the first glass plate 10 and the second outer principal surface 20a of the second glass plate 20, respectively. Accordingly, it is possible to inhibit water from entering the deep portion of the groove G2 of the grazing gasket 5A. Also, the valve bodies 67 and 68 support the vacuum glass 2 from the two sides, and thus the weight applied to the bottom contact faces of the vacuum glass 2 is further reduced.

The grazing gasket 5A of this embodiment is entirely constituted by an elastic body (soft material), and can be formed using EPDM (ethylene-propylene-dien rubber), CR (chloroprene rubber), silicone rubber, PVC (polyvinyl chloride), TPO (olefin-based elastomer), or the like, for example. Accordingly, the bottom portion 63 is deformed corresponding to the misalignment between the glass plates 10 and 20, and the areas of contact between the bottom portion 63 and the lower faces 10c and 20c are increased. This makes it possible to mitigate the concentration of stress at the bottom contact face of the vacuum glass 2 and protect the vacuum glass 2.

The thickness of the bottom portion 63 (an average thickness is used when the thickness is not uniform) is taken as d5. From the viewpoint of exhibiting cushioning properties as described above, d5 is preferably 0.5 mm or more, more preferably 1 mm or more, and even more preferably 1.5 mm or more. In addition, it is preferable that d5 is larger than h.

The bottom portion 63 is provided with a drain hole 64. A plurality of drain holes 64 are arranged at predetermined intervals in the longitudinal direction of the bottom portion 63. Since these drain holes 64 as well as the above-described drain holes 44 of the sash 4 are provided, even when water enters the groove G2 of the grazing gasket 5A and/or the groove G1 of the sash 4, this water can be easily discharged from the grooves. As a result, it is possible to prevent the sealing member 31 from being in contact with water for a long period of time and thus deteriorating, and to maintain the degree of vacuum of the depressurized layer 3.

3. MODIFIED EXAMPLES

Although an embodiment of the present invention has been described above, the present invention is not limited to the above embodiment, and various modifications can be carried out without departing from the gist of the invention. For example, the following modifications can be carried out. Moreover, the key points of the following modified examples can be combined as appropriate.

3-1

Although the grazing gasket 5A is formed in one piece using the same material in the embodiment above, the grazing gasket 5A may also be formed by combining members made of different materials. In this case, from the viewpoint of exhibiting the cushioning properties as described above for the lower faces 10c and 20c of the vacuum glass 2, it is preferable to form at least the bottom portion 63 using an elastic body.

As described above, the grazing gasket 5A can be formed using two or more materials. In this case, some portions can be formed using a hard material, and the other portions can be formed using a soft material. For example, a configuration can be employed in which the bottom portion 63 and the groove walls 61 and 62 are formed using hard vinyl chloride, and the wall portions 65 and 66 are formed using an elastomer (rubber elastic material).

Although the materials of the grazing gasket 5A can be selected from hard and soft materials according to portions as appropriate, using a hard material (e.g., hard vinyl chloride that has been made harder through the addition of a plasticizer) to form the bottom portion 63 and the groove walls 61 and 62 is excellent in that the weights of the glass plates 10 and 20 are easily transferred to the grazing gasket 5A. On the other hand, using a soft material (e.g., elastomer) to form the bottom portion 63 and the groove walls 61 and 62 is excellent in that the end faces of the glass plates 10 and 20 can be protected. Using a hard material to form the wall portions 65 and 66 is excellent in that the grazing gasket 5A can strongly clamp the glass plates 10 and 20 because the forces F1 and F2 applied to the glass plates 10 and 20 are increased. On the other hand, using a soft material to form the wall portions 65 and 66 is excellent in that the areas of contact between the grazing gasket 5A and the glass plates 10 and 20 are increased, the frictional forces therebetween are increased, and as a result, the grazing gasket 5A can strongly clamp the glass plates 10 and 20.

3-2

The grazing gasket 5A can also be realized as a grazing bead including two separate clamping portions for clamping the vacuum glass 2 from the two sides.

3-2

Although FIG. 3 shows the example in which the first glass plate 10 on the outdoor side is misaligned downward relative to the second glass plate 20 on the indoor side, the same grazing gasket 5A can be used when the second glass plate 20 is misaligned downward relative to the first glass plate 10.

LIST OF REFERENCE NUMERALS

1 Vacuum glass panel
2 Vacuum glass
10 First glass plate
10a First outer principal surface
10b First inner principal surface
10c First lower face
20 Second glass plate
20a Second outer principal surface
20b Second inner principal surface
20c Second lower face
3 Depressurized layer
4 Sash
41 Groove wall
42 Groove wall
43 Bottom portion
44 Drain hole
5 Grazing gasket
65a Clamping portion
66a Clamping portion
64 Drain hole
G1 Groove
G2 Groove

The invention claimed is:

1. A vacuum glass panel comprising:
vacuum glass including:
a first glass plate having a first outer principal surface, a first inner principal surface, and a first lower face;
a second glass plate having a second outer principal surface, a second inner principal surface, and a second lower face, and having substantially the same area as an area of the first glass plate in a front view; and
a depressurized layer arranged between the first inner principal surface and the second inner principal surface opposed to the first inner principal surface, the first lower face and the second lower face being misaligned relative to each other in a vertical direction;
a sash including two groove walls that define a groove for receiving upper, lower, left, and right peripheral edge portions of the vacuum glass in a front view; and
a glazing gasket that is arranged on at least a lower portion of the vacuum glass inside the groove and seals gaps between the vacuum glass and the groove walls of the sash,
wherein an amount of misalignment between the first lower face and the second lower face of the vacuum glass in a vertical direction is 0.5 mm or more, wherein the glazing gasket includes a lower portion arranged inside the groove of the sash, and an upper portion protruding from the groove of the sash, wherein the lower portion of the glazing gasket includes two groove walls, and a bottom portion that couples the lower portions of the groove walls, wherein only the vicinities of the upper end portions of the groove walls of the glazing gasket are in contact with the inner faces of the groove walls of the sash, wherein the upper portion of the glazing gasket includes a clamping portion for clamping the vacuum glass from the first outer principal surface and the second outer principal surface near top portions of the groove walls of the glazing gasket, wherein the upper portion and the lower portion of the glazing gasket are made of different materials, and the two groove walls of the glazing gasket are made of the same material.

2. The vacuum glass panel according to claim 1, wherein the areas of the first glass plate and the second glass plate in a front view are 1 m² or more.

3. The vacuum glass panel according to claim 1, wherein the glazing gasket further includes a bottom portion facing the first lower face and the second lower face.

4. The vacuum glass panel according to claim 3, wherein the bottom portion is constituted by an elastic body and is in contact with at least one of the first lower face and the second lower face.

5. The vacuum glass panel according to claim 3, wherein the bottom portion has a thickness of 0.5 mm or more, and the thickness is larger than an amount of misalignment between the first lower face and the second lower face in a vertical direction.

6. The vacuum glass panel according to claim 1, wherein the clamping portion clamps the vacuum glass from the first outer principal surface and the second outer principal surface at a point, the distance between the point and the upper end of the top portion is greater than 0 mm and less than 20 mm.

7. The vacuum glass panel according to claim 1, wherein the sash and the glazing gasket are provided with a drain hole.

8. The vacuum glass panel according to claim 1, wherein the first lower face and the second lower face are not in parallel with each other in a front view.

* * * * *